June 26, 1945. S. C. WATSON 2,378,963
GEAR GENERATOR
Filed April 5, 1941 3 Sheets-Sheet 2

Inventor
Sydney C. Watson
by Parker & Carter
Attorneys.

June 26, 1945. S. C. WATSON 2,378,963
GEAR GENERATOR
Filed April 5, 1941   3 Sheets-Sheet 3

Inventor
Sydney C. Watson
by Parker & Carter
Attorneys.

Patented June 26, 1945

2,378,963

UNITED STATES PATENT OFFICE 2,378,963

GEAR GENERATOR

Sydney C. Watson, Chicago, Ill., assignor to Tor-Vel Associates, having as trustees Sydney C. Watson and Alvin J. Parcelle Application April 5, 1941, Serial No. 387,039

14 Claims. (Cl. 90—4)

This invention relates to a machine for and a method of cutting or generating worm gears of a type known as "barrel-shaped" worms, and for cutting these worms by the hobbing method. The hobbing method is in general use for cutting spur, helical and spiral gears. One object of the invention is to provide a hobbing machine and a method of hobbing which can accomplish the above result. The conventional hobbing machines for cutting spur, helical or spiral gears cannot be used for cutting barrel-shaped worms.

One use of such barrel-shaped worms is in an internal worm drive where a driving worm is placed within a driven worm wheel instead of being outside of a worm wheel, as in the conventional worm drive. One form of the barrel-shaped worm referred to is shown in the accompanying drawings. Such worms are also shown in use in my prior patents, Nos. 2,208,614 and 2,209,367, although they are not limited to that use. The machine of the present invention includes means adapted to carry and to rotate a hob or cutter. The expression "hob," as used herein, refers to a worm in which the thread is gashed or cut across to form a series of cutting tools or edges giving the effect of an endless rack when the cutter is rotated. The machine includes also both manual and power means for rotating and for adjusting the hob spindle, and means for moving the hob toward and away from the work piece. It includes further means for supporting and rotating a work piece, means for adjusting the position of the work piece, and a cradle-like member in which the work piece and its supporting parts are carried, and means for moving the work piece with all the parts that it carries. The parts mentioned, and other parts, are shown in detail and will be described in connection with the figures, wherein:

Figure 5 is a view of one of the gears made by the mechanism shown in the other figures with parts in elevation and parts in section.

Like parts are designated by like characters throughout the specification and the drawings.

Figure 1:
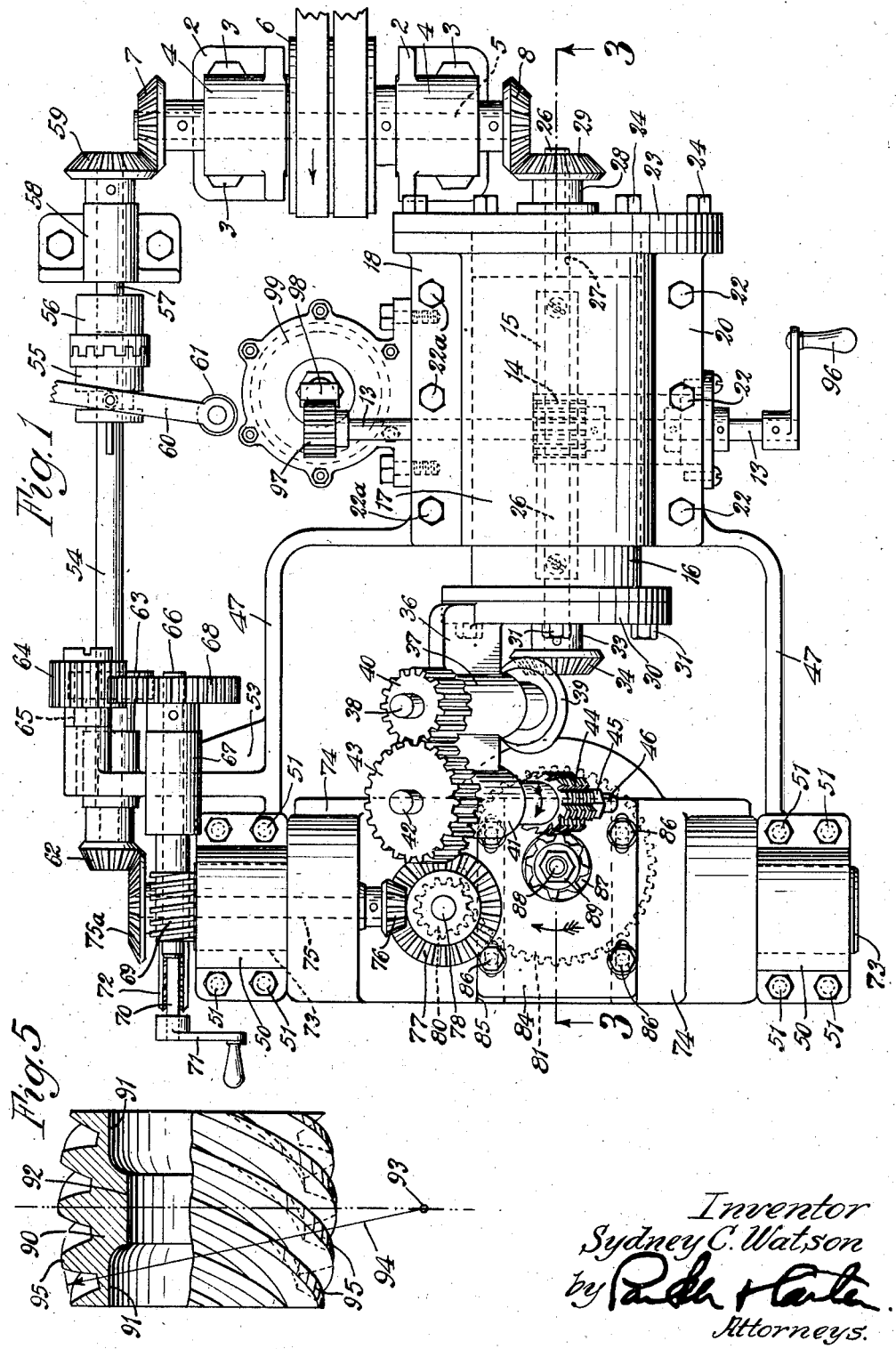
Figure 1 is a plan view with parts broken away and parts omitted.

The machine may be mounted upon any sort of a support or base 1. It includes a pair of vertical members 2 secured to the base by bolts or screws 3, 3, or otherwise. At their upper ends, the members 2 carry bearings 4 in which is mounted for rotation a shaft 5 upon which a pulley 6 may be positioned. At each of its outer ends, the shaft 5 carries beveled gears 7, 8. Positioned adjacent the members 2 are supports 9, 9 which carry a semi-cylindrical portion 10 which is grooved as at 11. The member 10 may be enlarged as at 12 to provide a housing and bearings for a shaft 13 and a pinion 14. The pinion is arranged to engage a rack 15 mounted to move in the groove 11 and secured to a cylindrical ram 16 which is positioned to move within the semi-cylindrical section 10. 17 is a semi-cylindrical member provided with a flange 18 which contacts a corresponding flange 19 formed on the member 10. The semi-cylindrical member 17 is on its opposite side provided with a flange 20 which does not contact the corresponding flange or portion 21 of the member 10. The flanges 20 and 21 may be in contact throughout a part of their length but are at one end separated from each other as shown particularly in Figure 2. Screws or bolts 22 serve to hold the flanges 20 and 21 together or to draw them toward each other. The flange 18 is secured to the flange 19 by bolts 22a.

Figures 3, 4:
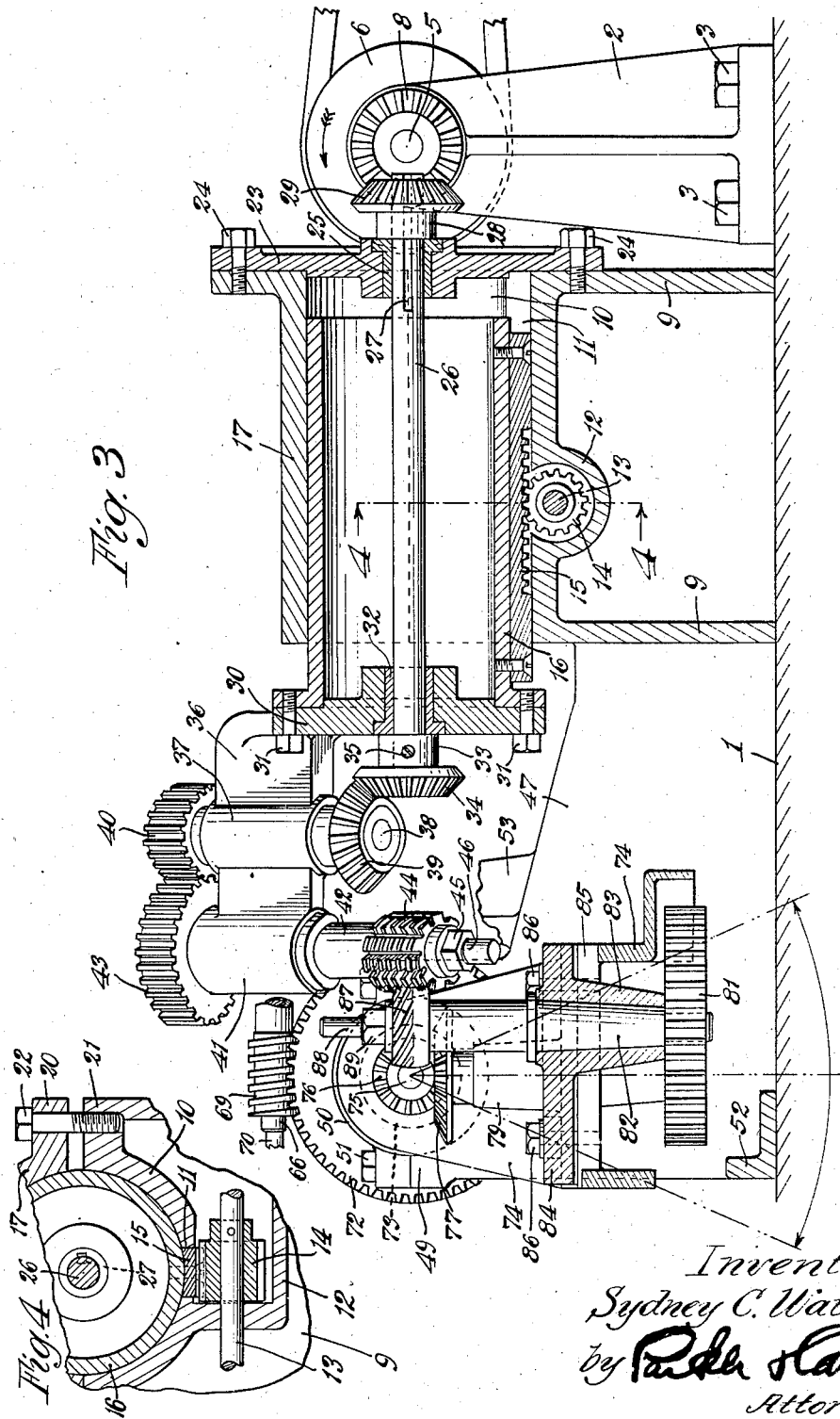
Figure 3 is a longitudinal vertical section taken at line 3—3 of Figure 1.
Figure 4 is a vertical cross sectional detail taken at line 4—4 of Figure 3.

At one end the cylindrical member formed of the sections 10 and 17 is closed by a plate 23 which is held in place by screws 24. This plate is perforated and is provided in the perforation with a bushing 25 in which one end of a shaft 26 is rotatably supported. This shaft is provided at its righthand end, as shown in Figure 3, with a key or keyway 27 which is slidably engaged by the hub 28 of a bevel gear 29, which gear meshes with the bevel gear 8. The cylindrical ram 16 is closed at its lefthand end, as shown in Figure 3, by a platelike member 30 which is held in place by screws 31 and which is perforated to receive a bushing 32 in which the opposite end of the shaft 26 is rotatably mounted. The hub 33 of a bevel gear 34 is fixed on the shaft 26 by a set screw 35 or otherwise. An extension or arm 36 is fastened to or formed integrally with the member 30 and is enlarged or provided with an enlargement 37 within which a stub shaft 38 is mounted for rotation. At one end the shaft carries a bevel gear 39 which meshes with the bevel gear 34. At its opposite end the shaft 38 carries a pinion 40. The member 36 is enlarged at or provided with an enlargement 41 within which the spindle 42 or hob carrier is mounted for rotation. At its outer end the spindle 42 has secured to it a gear 43 which meshes with the pinion 40. The spindle 42 is shaped to receive a hob 44 which is held in place by means of a nut 45 secured on the threaded reduced end 46 of the shaft 42.

Formed preferably integrally with the members 9 are side portions 47 which are provided with upwardly extending portions 48, and in the upper ends of which are formed bearing portions 49. Caps 50 complete the bearings. The caps are removably held in place by screws 51 or otherwise. The side members 47 may be joined at their forward ends by a portion 52, if desired. The various frame and supporting arrangements described are merely illustrative of a suitable form. The invention is not limited to any particular frame or supporting structure.

Extending upwardly from and preferably formed integrally with one of the side members 47 is an arm 53. It is shaped to provide a plurality of bearings. Thus, it provides a bearing for the driving shaft 54 which is provided with a clutch formed of the members 55 and 56, the member 55 being slidably mounted on the shaft 54, and the member 56 being fixed in a short shaft 57 which is supported in a bearing 58 and which carries at its outer end a bevel gear 59 which meshes with the gear 7 on the shaft 5. A lever 60 is supported at any suitable point—for example, in a bearing 61—and engages the clutch section 55. By means of it, the clutch may be manipulated. At its outer end the shaft 54 carries a bevel gear 62, and it has fixed to it intermediate its ends a pinion 63 which meshes with a pinion 64 on a stub shaft 65 which is also supported on the member 53. A second stub shaft 66 is supported in a bearing 67 formed with or supported upon the member 53. At one end this shaft carries a gear 68 which meshes with the pinion 64. Adjacent its other end it carries a worm gear 69, and on its outer end it is shaped as at 70 to receive a crank or handle 71.

The worm 69 meshes with a worm gear 72 which is secured to a hub 73a of one of the trunnions 73, 73 of a cradle 74. A shaft 75 passes through and is coaxial with the hub 73a and its associated trunnion 73. At its outer end the shaft 75 carries a bevel gear 75a which meshes with the bevel gear 62 on the shaft 54. At its inner end the shaft carries a bevel pinion 76 which meshes with a bevel gear 77 mounted on a shaft 78 which is supported in a bearing 79 attached to or formed integrally with the cradle 74. At its lower end the shaft 78 has fixed to it a pinion 80 which meshes with a pinion 81 fixed on a shaft 82 which is supported in a bearing member 83 which is fixed in a slide 84. The slide is mounted on and carried by the cradle 74. It is adjustably positioned in slide ways 85 formed on the cradle and is adjustably held in position by screws 86 so that it may be moved backward and forward across the cradle. At its upper end the shaft 82 is suitably shaped to receive a work piece 87, and is reduced and threaded as at 88 to receive a clamping nut 89 by means of which the work piece is removably held in place.

Figure 2:
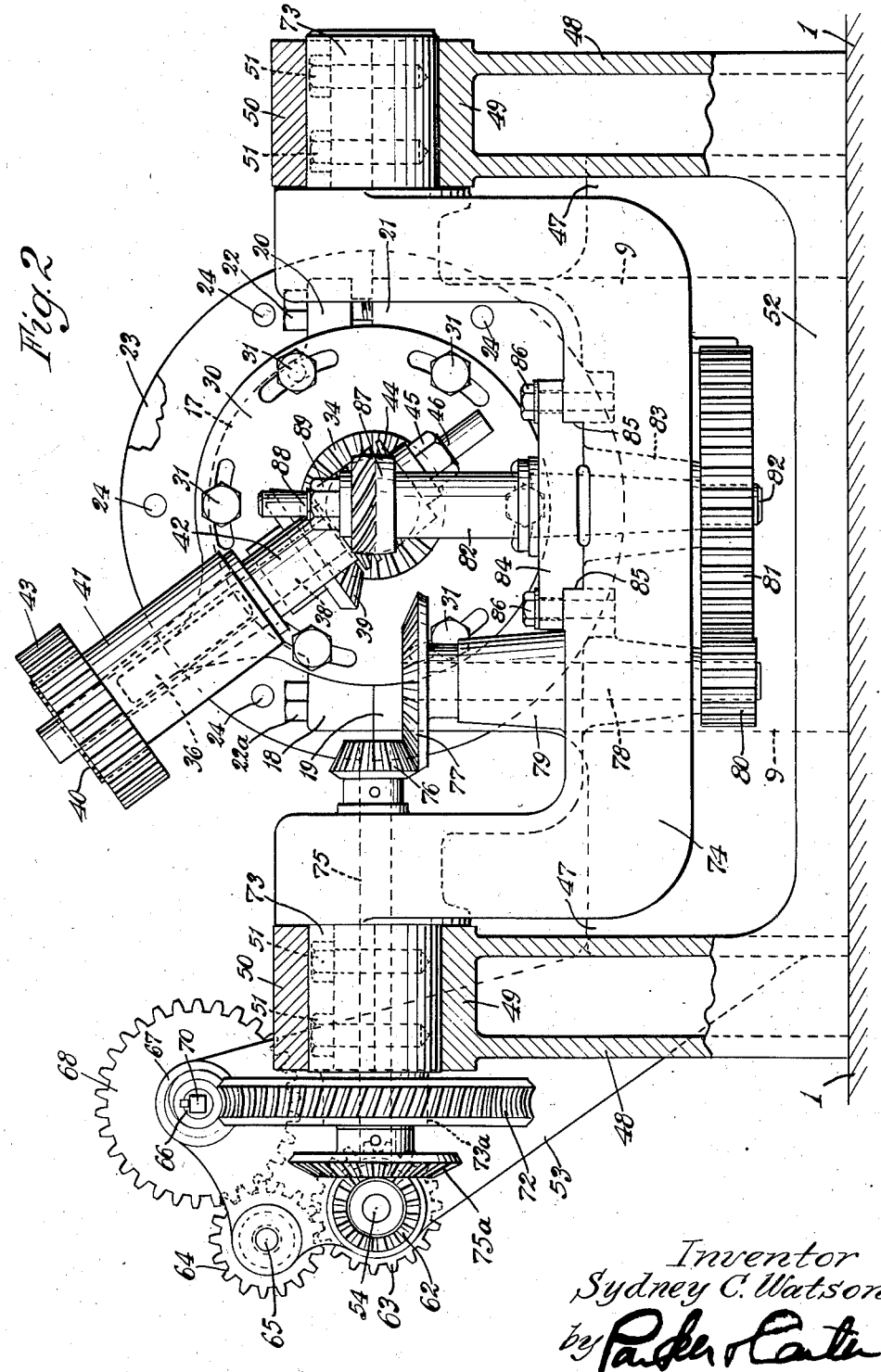
Figure 2 is a front-elevation looking toward the left end of Figure 1, with parts broken away and parts in section.

One typical gear which can be made by the machine shown is illustrated in Figure 5. As there shown it comprises what may be called a "barrel-shaped" worm gear 90. It is hollow and shaped as at 91, 91 to provide ball races for ball bearings. It may be provided with a raised land 92. It is curved on its exterior about a point 93, the radius being indicated by the line 94. Teeth 95 are cut in the exterior of the gear. The work piece 87, shown in Figures 1, 2 and 3, is such a gear in process of manufacture and, as there shown, the teeth have been cut for approximately one-half of their length. In order to adjust the hob 44 in relation to the work piece 87, there are provided two independent control means for the shaft 13 and gear 14, which serve to impart longitudinal movement to the cylindrical ram 16. Secured to one end of the shaft 13 is a manually controlled handle 96. The other end of the shaft 13 carries a pinion 97 which meshes with a rack bar 98 controlled by an air operated piston 99 within the housing. Any suitable controlling means may be provided for the operation of the air piston.

The use and operation of this invention are as follows:

Considering the mechanism shown, which is primarily adapted for the manufacture of barrel-shaped worms, it is evident that the barrel-shaped worms, when used in the devices of the United States patents, Nos. 2,208,614 and 2,209,367, must mesh with and operate a worm wheel in which the teeth are cut on the inside to form an internal gear. Since the axes of the worms lie in a plane approximately at right angles to the axis of the driven worm wheel, a section through each of the worms, taken on a plane coincident with its axis, is a true segment of a spur or helical gear, and there are in each worm two of such segments, one on each side of the axis, formed in any plane in which lies the axis of the worm. This is illustrated in Figure 5 in particular.

Each segment of the worm is described about a point 93 located outside the body of the worm and on the side of the worm opposite to the segment in question. One of these points usually approximately coincides with the center of the internal worm wheel with which the worm is in mesh.

The construction of the worms just mentioned requires that, while the worm is being cut, it must be slowly fed or partially rotated about the above mentioned point in addition to being rotated about its own axis. It is one of the objects of the invention herewith shown and described to accomplish this feed.

The hob spindle 42 is carried in bearings supported on what is commonly known as a "hob swivel" 30, 36, which in turn carries an intermediate shaft 38 whose axis lies in the same plane as the hob axis. The plane in which lies the axis of the hob and the intermediate shaft 38 intersects the axis of the shaft 26. This axis coincides with the point about which the hob swivel is rotated for adjustment to bring the thread on the hob in line with the threads on the work piece so that the individual cutting points of the hob cut a suitable path in the work.

This intermediate shaft 38 is connected with and drives the hob spindle 42 through a pair of spur or helical gears 40, 43 while the intermediate shaft 38 is in turn driven by the pair of bevel gears 34, 39 from the shaft 26 whose axis coincides with the point about which the hob swivel 42 can be adjusted.

This hob swivel assembly is rigidly mounted on the end of the hollow ram 16 which is in turn carried in a suitable hole formed by the bed 10 and bearing cap 17. This ram is free to slide endwise in its bed when necessary to adjust the depth of cut or to back the cutter away when loading or unloading work from the work spindle. The ram is prevented from turning in its bed by the key 15 which has rack teeth cut in one side to engage the pinion 14 mounted on the shaft 13 rotated by the crank handle 96, thereby providing means for sliding the ram longitudinally within certain limits by hand. Also on the same shaft 13 is a pinion 97 meshed with a rack 98 connected to the rod and piston of an air cylinder 99 operated by compressed air; thereby, means are provided for rapidly moving the ram to or from the work under the control of a suitable valve, either hand or automatic. When the ram is set to the correct depth of cut, it can be securely locked in place by the clamping action of the bearing cap 17 when tightened down by the bolts 22.

Located in the center of the ram and projecting through the plate 23 and free to slide through the bevel gear 29 is the shaft 26 which thus provides a connecting and driving means between the driving pulley and the shaft 6 and the hob or cutter 44.

Up to this point the hob or cutter, its functions, method of driving and means for supporting it have been described.

The work or the worm to be cut will now be discussed.

In the conventional hobbing machine the rate of feed is expressed as a linear dimension usually in thousandths of an inch per each revolution of the work because the hob is fed in a straight line past the work in a direction parallel to the work axis and in the same direction.

In the machine of this invention, however, an essential difference is in the type of feed used. The rate of feed must now be expressed as an angular dimension such as degrees or parts of a degree per each revolution of the work. This is made necessary because, contrary to general practice, the work is now being fed along a circular path at a predetermined radius around a fixed point, past the hob which remains definitely located. In the conventional hobbing machine, the hob or cutter is fed in a straight line past the work which remains definitely located.

To accomplish the angular feeding of the work, there is provided the cradle 74 having hollow trunnions 73 which are carried in bearings formed when the caps 50 are assembled to the bed casting 49.

The center line or axes of these bearings are approximately at right angles to the center line or axis of the hole forming the bearing which carries the ram 16, which supports the hob swivel and also the hob or cutter.

For greatest accuracy, in the work done or the functions performed, these two center lines or axes should lie in the same plane. Securely attached to this cradle 74 is a movable saddle 84 which contains the bearing in which the work-carrying spindle 82 is rotatably mounted. The distance between the work spindle and axis of the trunnion bearings about which the cradle 74 swings can be varied and set at will to accommodate different diameters of work or worms to be cut or generated for use with different diameters of internal worm wheels.

Also mounted in this cradle 74 is a rotatable shaft 78 lying approximately parallel to, and in the same plane as, the work-carrying spindle 82. This shaft and work spindle are connected together by two or more changeable spur or helical gears 80, 81.

Also rotatably mounted in one of the hollow trunnions 73 of the cradle 74 is a shaft 75 whose axis coincides with the axis of the bearing in which the cradle swings or moves. This shaft 75 is in turn connected to and drives the shaft 78 through the medium of the bevel gears 77, 76.

Carried in suitable bearings attached to the bed of the machine is an intermediate shaft 54, which is in turn connected at one end to the shaft 75 through the bevel gears 62, 75a while at the other end it is connected to the drive shaft 5 and pulley 6 through the bevel gears 7, 59.

The construction thus far described will accomplish two objects: first, to support the work or worm to be cut and the hob or cutter in correct relation to each other; second, to rotate the work and the hob at the correct relative speeds by means of the adjustable and changeable gear train interposed between the driving shaft and pulley 6 and the hob or cutter and the work or the worm to be cut.

The method and means of feeding the work or worm to be cut past the hob or cutter will now be described.

The worm wheel 72 is rotated or driven by the worm 69 with which it is in mesh. The gear 63 drives or rotates the gear 68 through, or by means of, one or more idler gears 64. From the above, it is clear that the intermediate shaft 54 now drives or imparts rotary motion to both the work or worm to be cut and the cradle which carries the work.

Thus, the mechanism herein described provides the following:

Means for holding and locating the work or worm to be cut and the hob or cutter in the proper relative positions.

Means for rotating or driving the work or worm to be cut and the hob or cutter in unison at the correct relative speeds.

Means for feeding the work or worm to be cut past the hob or cutter in a predetermined path at the correct rate in relation to the rotative speeds of both the work and the cutter.

A complete train of gears which imparts rotary motion to all parts requiring such motion from a common source of power or turning effort such as a driven pulley, shaft, electric motor or other prime mover.

A complete train of gears in which the proportion of the component gears relative to each other can be varied or altered at will so as to impart different relative rotative speeds to the work, hob and feed mechanism (cradle) in order to be able to cut or generate worms of different diameters and different numbers of threads or when using different and suitable hobs or cutters within the limits of the capacity of the machine.

A machine to correctly generate barrel-shaped worms having one or more threads.

In the generation of one of the gears shown in Figure 5, the following process is generally carried out:

The ram 16 is moved to the right from the position of Figure 3, either manually or by the power means shown. A blank for the worm is mounted on the reduced portion 88 of the spindle 82, and is secured in place by the nut 89. The ram is then moved forward or to the left to bring the hob in proper position for cutting. The mechanism is set in motion, the hob is rotated and the gear blank is also rotated. Since the spindle 82 is mounted on the cradle 74, that cradle is also rotated or swung. It moves through an arc which may be that defined by the dotted lines shown on the cradle in Figure 3. Whatever the exact length of the arc through which the cradle swings, it is sufficient to move the gear blank with relation to the hob so that the entire gear is suitably cut. Upon the completion of the cutting operation, the mechanism is stopped, the ram is moved to the right to free the hob from contact with the gear, which has now been completed, and the cradle is swung back from the righthand side of the arc to the lefthand side of Figure 3. The finished gear is removed, a new blank is put in position, the ram is moved back to the working position, the parts are set in operation, and again, as the hob rotates, the gear is rotated and the cradle is swung and a new gear is cut or generated.

The assembly is adjustable. Thus, the member 30 is adjustably mounted and may be swung so as to move the part 36 and all that it carries to a new position of adjustment. Also, the slide 84 may be moved in the cradle. This may be done for many reasons to adapt the machine for the generation of a different size of gear, and, when it is done, other driving means may be substituted for the pinion 80 and the gear 81. All of the gears which drive the hob spindle and the gears which drive the work carrying spindle 82 and the gears which are driven by the shaft 54, and hence drive the worm 69 as well as the shaft 65, are arranged so that they may be removed and others substituted.

I claim:

1. In a gear generating machine, a cutting tool and means for supporting and driving it, a support, said support having secured to it means for carrying a cutter and means for driving said cutter, and a work holding means, said means including a cradle mounted for arcuate movement, means for giving it such movement, and a work supporting spindle on said cradle, means for securing a work piece to said spindle, and means for rotating said spindle, said cradle being provided with two widely separated co-axial trunnions, and a drive for said spindle, said drive including a part concentric with and passing through one of said trunnions.

2. In a gear generating machine, a cutting tool and means for supporting and driving it, a support, said support having secured to it means for carrying a cutter and means for driving said cutter, and a work holding means, said means including a cradle mounted for arcuate movement, means for giving it such movement, and a work supporting spindle on said cradle, means for securing a work piece to said spindle, and means for rotating said spindle, said spindle rotating means including parts coaxial with said cradle moving means.

3. In a gear generating machine, a cutting tool and means for supporting and driving it, said means including a ram, a support adjustably mounted on said ram, said support having secured to it means for carrying a cutter and means for driving said cutter, said driving means including a shaft mounted concentrically with the ram whereby the cutter is driven in all positions of adjustment of the support with respect to the ram, and a work holding means, said means including a cradle mounted for arcuate movement, means for giving it such movement, and a work supporting spindle on said cradle, means for securing the work piece to said spindle, and means for rotating said spindle, said spindle rotating means including parts coaxial with said cradle moving means.

4. In combination in a gear generating mechanism, a ram, a support therefor, means for moving said ram with respect to said support, a cutter carrier mounted on said ram, and means for rotating said cutter, said rotating means including parts positioned within said ram, and a work piece carrying assembly including a cradle mounted for swinging said cradle including a pair of widely separated coaxial trunnions, and means for swinging said cradle, and a work carrying spindle mounted on said cradle, and means for rotating said spindle, said spindle rotating means including parts coaxial with said trunnions and parts positioned at right angles to the axis of said trunnions.

5. In combination in a gear generating mechanism, a ram, a support therefor, manual and power means for moving said ram with respect to said support, a cutter carrier mounted on said ram, and means for rotating said cutter, said rotating means including parts positioned within said ram, and a work piece carrying assembly including a cradle mounted for swinging, said cradle including a pair of widely separated co-axial trunnions and means for swinging said cradle, and a work carrying spindle mounted on said cradle, and means for rotating said spindle, said spindle rotating means including parts coaxial with said trunnions and parts positioned at right angles to the axis of said trunnions.

6. In combination in a gear generating mechanism, a ram, a support therefor, means for moving said ram with respect to said support, a cutter carrier mounted on said ram, and means for adjusting said carrier angularly with respect to said ram, and means for rotating said cutter, said rotating means including parts mounted on said carrier and parts positioned within and coaxial with respect to said ram, and a work piece carrying assembly including a cradle mounted for swinging, said cradle including a pair of widely separated co-axial trunnions, the longitudinal axis of said ram intersecting with the axis of rotation of said cradle, and means for swinging said cradle, and a work carrying spindle mounted on said cradle, and means for rotating said spindle, said spindle rotating means including parts coaxial with said trunnions and parts positioned at right angles to the axis of said trunnions.

7. In combination in a gear generating mechanism, a ram, a support therefor, means for moving said ram with respect to said support, a cutter carrier mounted on said ram, and means for rotating said cutter, said rotating means including parts positioned within said ram, and a work piece carrying assembly including a cradle mounted for swinging said cradle including a pair of widely separated coaxial trunnions, and means for swinging said cradle, the longitudinal axis of said ram intersecting with the axis of rotation of said cradle, and a work carrying spindle mounted on said cradle, and means for rotating said spindle as said cradle is swung, said spindle rotating means including parts coaxial with said trunnions and parts positioned at right angles to the axis of said trunnions.

8. In combination in a gear generating mechanism, a ram, a support therefore, means for moving said ram with respect to said support, a cutter carrier mounted on said ram, and means for rotating said cutter, said rotating means including parts positioned within said ram, and a work piece carrying assembly including a cradle mounted for swinging said cradle including a pair of widely separated coaxial trunnions, and means for swinging said cradle, the longitudinal axis of said ram intersecting with the axis of rotation of said cradle, and a work carrying spindle mounted on said cradle, and means for rotating said spindle as said cradle is swung, said spindle rotating means including parts coaxial with said trunnions and parts positioned at right angles to the axis of said trunnions, and a single power means, said power means adapted to move said cutter to rotate said work piece and to swing said cradle simultaneously.

9. In combination in a gear generating mechanism, a ram a support therefor, manual and power means for moving said ram with respect to said support, a cutter carrier mounted on said ram, and means for adjusting said carrier angularly with respect to said ram, and means for rotating said cutter, said rotating means including parts mounted on said carrier and parts positioned within and coaxial with respect to said ram, and a work piece carrying assembly including a cradle mounted for swinging said cradle including a pair of widely separated coaxial trunnions, and means for swinging said cradle, and a work carrying spindle mounted on said cradle, and means for rotating said spindle, said spindle rotating means including parts coaxial with said trunnions and parts positioned at right angles to the axis of said trunnions.

10. In combination in a gear generating mechanism, a ram, a support therefor, manual and power means for moving said ram with respect to said support, a cutter carrier mounted on said ram, and means for adjusting said carrier angularly with respect to said ram, and means for rotating said cutter, said rotating means including parts mounted on said carrier and parts positioned within and coaxial with respect to said ram, and a work piece carrying assembly including a cradle mounted for swinging said cradle including a pair of widely separated coaxial trunnions and means for swinging said cradle, and a work carrying spindle mounted on said cradle, and means for rotating said spindle as said cradle is swung, said spindle rotating means including parts coaxial with said trunnions and parts positioned at right angles to the axis of said trunnions and a single power means, said power means adapted to move said cutter to rotate said work piece and to swing said cradle simultaneously.

11. In combination in a gear generating mechanism, a ram, a support therefor, means for moving said ram with respect to said support, a cutter carrier mounted on said ram, and means for rotating said cutter, said rotating means including parts positioned within said ram, and a work piece carrying assembly including a cradle mounted for swinging, and means for swinging said cradle, and a work carrying spindle mounted on said cradle, and means for rotating said spindle, said spindle rotating means including driving parts coaxial with the axis of swinging of said cradle.

12. In combination in a gear generating mechanism, a ram, a support therefor, means for moving said ram with respect to said support, a cutter carrier mounted on said ram, and means for rotating said cutter, said rotating means including a shaft and a member offset from said ram, said offset member including a plurality of bearings, a plurality of shafts and a plurality of gears, one of said shafts comprising said cutter carrier, and a work piece carrying assembly including a cradle mounted for swinging, and means for swinging said cradle, and a work carrying spindle mounted on said cradle, and means for rotating said spindle.

13. In combination in a gear generating mechanism a movably mounted supporting member, a support therefor, means for moving said supporting member with respect to said support, and a cutter carrier mounted on said supporting member and including a part offset with respect thereto, a cutter mounted on said carrier for rotation and means for rotating said cutter, a work piece carrying assembly including a cradle, mounted for swinging, and means for swinging said cradle and a work carrying part rotatably mounted on said cradle and means for rotating said part, said means including a driving member positioned coaxially with the axis of swinging of said cradle and including also a geared reduction drive supported by said cradle.

14. In combination in a gear generating mechanism a movably mounted supporting member, a support therefor, means for moving said supporting member with respect to said support, and a cutter carrier mounted on said supporting member and including a part offset with respect thereto, a cutter mounted on said carrier for rotation and means for rotating said cutter, a work piece carrying assembly including a cradle, mounted for swinging, and means for swinging said cradle and a work carrying part rotatably mounted on said cradle and means for rotating said part, said means including a driving member positioned coaxially with the axis of swinging of said cradle and including also a geared reduction drive supported by said cradle, the longitudinal axis of said supporting member and the swinging axis of said cradle intersecting each other.

SYDNEY C. WATSON.